United States Patent
Smolny et al.

(10) Patent No.: US 11,277,267 B2
(45) Date of Patent: Mar. 15, 2022

(54) FINE-GRAINED TOKEN BASED ACCESS CONTROL

(71) Applicant: International Business Machines Corporation, Armonk, NY (US)

(72) Inventors: Martin Smolny, Boeblingen (DE); Thomas Dürr, Magstadt (DE); Michael Beck, Bad Teinach-Zavelstein (DE); Juergen Schaeck, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 16/810,893

(22) Filed: Mar. 6, 2020

(65) Prior Publication Data

US 2020/0358615 A1 Nov. 12, 2020

(30) Foreign Application Priority Data

May 7, 2019 (EP) .................................... 19172926

(51) Int. Cl.
*H04L 29/06* (2006.01)
*H04L 9/32* (2006.01)

(52) U.S. Cl.
CPC .......... *H04L 9/3234* (2013.01); *H04L 63/083* (2013.01); *H04L 63/108* (2013.01)

(58) Field of Classification Search
CPC ... H04L 9/3234; H04L 63/108; H04L 63/083; H04L 63/102; H04L 63/105; H04L 63/0807

(Continued)

(56) References Cited

U.S. PATENT DOCUMENTS

| 6,766,454 B1 * | 7/2004 | Riggins ............... H04L 63/0838 713/185 |
| 7,673,135 B2 * | 3/2010 | Chin ................... H04L 63/0807 713/159 |

(Continued)

FOREIGN PATENT DOCUMENTS

| CN | 109309683 A | 2/2019 |
| WO | 2019036012 A1 | 2/2019 |

OTHER PUBLICATIONS

Support for intention driven cloud government entitlement services, Karam et al, , Jan. 2013 (Year: 2013).*

(Continued)

*Primary Examiner* — Jahangir Kabir
(74) *Attorney, Agent, or Firm* — Scott Dobson

(57) ABSTRACT

A computer-implemented method for a token-based authorization in a data processing environment may be provided. The data processing environment comprises at least a user system, an application, an authentication server and an access control server. The method comprises accessing the application via a user system request, redirecting the user access request to an authentication server, authenticating the user, wherein authentication credentials comprise a request for a restricted entitlement, wherein the restricted entitlement represents a subset of existing entitlements managed by the access control server for a resource. The method comprises also sending an access token from the authentication server to the application, requesting execution of an operation comprising invoking the operation by the application providing the access token comprising restricted entitlements, invoking the access control server, and providing the scope of the token comprising the subset of the existing entitlements.

17 Claims, 15 Drawing Sheets

(58) Field of Classification Search
USPC .......................................................... 713/159
See application file for complete search history.

(56) References Cited

U.S. PATENT DOCUMENTS

| | | | | |
|---|---|---|---|---|
| 8,566,462 | B2* | 10/2013 | Jun | ........................ G06Q 30/00 709/229 |
| 8,868,915 | B2* | 10/2014 | Counterman | ....... G06F 21/6281 713/176 |
| 9,578,014 | B2 | 2/2017 | Sondhi et al. | |
| 10,097,551 | B2 | 10/2018 | Chan et al. | |
| 10,104,084 | B2 | 10/2018 | Biggs et al. | |
| 2005/0125677 | A1* | 6/2005 | Michaelides | ......... H04L 9/3234 713/185 |
| 2018/0060595 | A1 | 3/2018 | Olds et al. | |
| 2018/0351958 | A1* | 12/2018 | Sakurai | ............... G06F 16/9566 |
| 2019/0068575 | A1 | 2/2019 | Vongsouvanh et al. | |

OTHER PUBLICATIONS

International Search Report and Written Opinion, Application No. PCT/IB2020/053254, Filed Apr. 6, 2020, 7 pages.

Hardt, "The OAuth 2.0 Authorization Framework", Internet Engineering Task Force, Oct. 2012, Microsoft, ISSN: 2070-1721, 76 pages. https://tools.ietf.org/html/rfc6749.

Brandur, "Scoping and OAuth 2", Published Jul. 23, 2013, San Francisco, 5 pages. https://brandur.org/oauth-scope.

"OASIS eXtensible Access Control Markup Language (XACML) TC", OASIS, Open Standards, Open Source, Copyright © 2017 OASIS, printed Feb. 18, 2020, 11 pages. https://www.oasis-open.org/committees/tc_home.php?wg_abbrev=xacml.

"Permissions and consent in the Microsoft identity platform endpoint", Microsoft Azure, dated Jan. 3, 2020, 16 pages. https://docs.microsoft.com/en-us/azure/active-directory/develop/v2-permissions-and-consent.

"OAuth 2.0 Scopes for Google APIs" Google Identity Platform, printed Feb. 18, 2020, 2 pages. https://developers.google.com/identity/protocols/googlescopes.

Smolny et al., "Fine-Grained Token Based Access Control", Application No. EP19172926.8, Filed May 7, 2019.

Cloud Foundry Documentation, Scopes, printed Feb. 18, 2020, 17 pages. https://docs.cloudfoundry.org/concepts/architecture/uaa.html#scopes.

* cited by examiner

| |
|---|
| Check 1: Does the list of scopes contain ibm ?<br>   Yes: Continue with policy evaluation<br>   No: Continue with next step |
| Parse the CRN of the resource to be checked. Details about the CRN syntax can be found in section *"Syntax and Semantic of limited entitlements"*.<br>Extract if available: crn-service-name, crn-service-instance, crn-resource-type, crn-resource |
| Check 2: For each scope in the list of scopes do:<br>Details about the scope syntax can be found in section *"Syntax and Semantic of limited entitlements"*. Split scope into scope-service-name, scope-service-instance, scope-resource-type, scope-resource; individual parts can be empty. |
|         Check<br>        (crn-service-name matches scope-service-name)<br>        AND<br>        ( (crn-service-instance not available and scope-service-name<br>          not available) OR<br>  (crn-service-instance available and scope-service-name not available) OR<br>  (crn-service-instance available and matches scope-service-name))<br>AND<br>((crn-resource-type not available and scope-resource-type not available) OR<br> (crn-resource-type available and scope-resource-type not available) OR<br> (crn-resource-type available and matches scope-resource-type))<br>AND<br>((crn-resource not available and scope-resource not available) OR<br> (crn-resource available and scope-resource not available) OR<br> (crn-resource available and matches scope-resource))<br><br>Does the actual scope match this check?<br>   Yes: Continue with policy evaluation<br>   No: Continue with next scope<br>No matching scope found? Return DENY |
| Policy Evaluation ... |

FIG. 13

FINE-GRAINED TOKEN BASED ACCESS CONTROL

BACKGROUND

The disclosure relates generally to a method for a token-based authorization, and more specifically, to a computer-implemented method for a token-based authorization in a data processing environment. The disclosure is further directed to a related access system for a token-based authentication in a data processing environment, and a related computer program product.

Over the last decade, token-based authentication and authorization systems have evolved. In these systems, an end-user authenticates against an authorization server and gets back a temporary token which proves the authorization of that end-user and optionally also his identity. This token is used, e.g., by Web-based user interfaces (UI) to invoke back-end services securely. As no credentials flow to those services, token-based systems enable an eco-system for services of different vendors which can leverage the same authorization system. For more complex interactions between services, it is also possible to pass-through the token from the UI through a service to another down-stream service.

As part of the token data, the payload usually carries sets of authorization, called "scopes". The scopes are handled very differently in the various token-based systems. From a standardization perspective, only a few keywords for scopes are reserved, while other authorization is up to the authorization framework. Many of those frameworks adapted an action and/or role-based models which are often describing a service, a component and/or in action. For example, a function call like "database.query.read" would be such a potential scope.

SUMMARY

According to one aspect of the present disclosure, a computer-implemented method for a token-based authorization may comprise at least a user system, an application, an authentication server and an access control server. Thereby, the user system may be connected via a network connection to a server executing the application, and the application may provide an access to an operation. At least the operation may be identifiable by its identifier.

The method may comprise accessing the application via a user system request, redirecting the user access request to an authentication server, and authenticating the user by authentication credentials exchanged between the authentication server and the application. Thereby, the authentication credentials may comprise a request for a restricted entitlement using a standard semantic of a scope, and the restricted entitlement may represent a subset of existing entitlements managed or controlled by the access control server for a resource.

The method may further comprise sending an access token together with a refresh token from the authentication server to the application if the authentication has been successful and the application has been registered at the authentication server, wherein the access token and the refresh token comprises the restricted entitlement.

The requesting execution of an operation by the application initiated by the user system may comprise invoking the operation by the application providing the access token comprising restricted entitlements, invoking the access control server by the operation, providing an identifier of the user system and the scope of the token comprising the subset of the existing entitlements to the access control server, using the subset of entitlements for filtering the existing entitlements by the access control server resulting in an access decision of the user system to the operation.

According to another aspect of the present disclosure, a related access system for a token-based authorization in a data processing environment may be provided.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present disclosure, are apparent from the examples of embodiments to be described hereinafter and are explained with reference to the examples of embodiments, but to which the disclosure is not limited.

Figure 1:
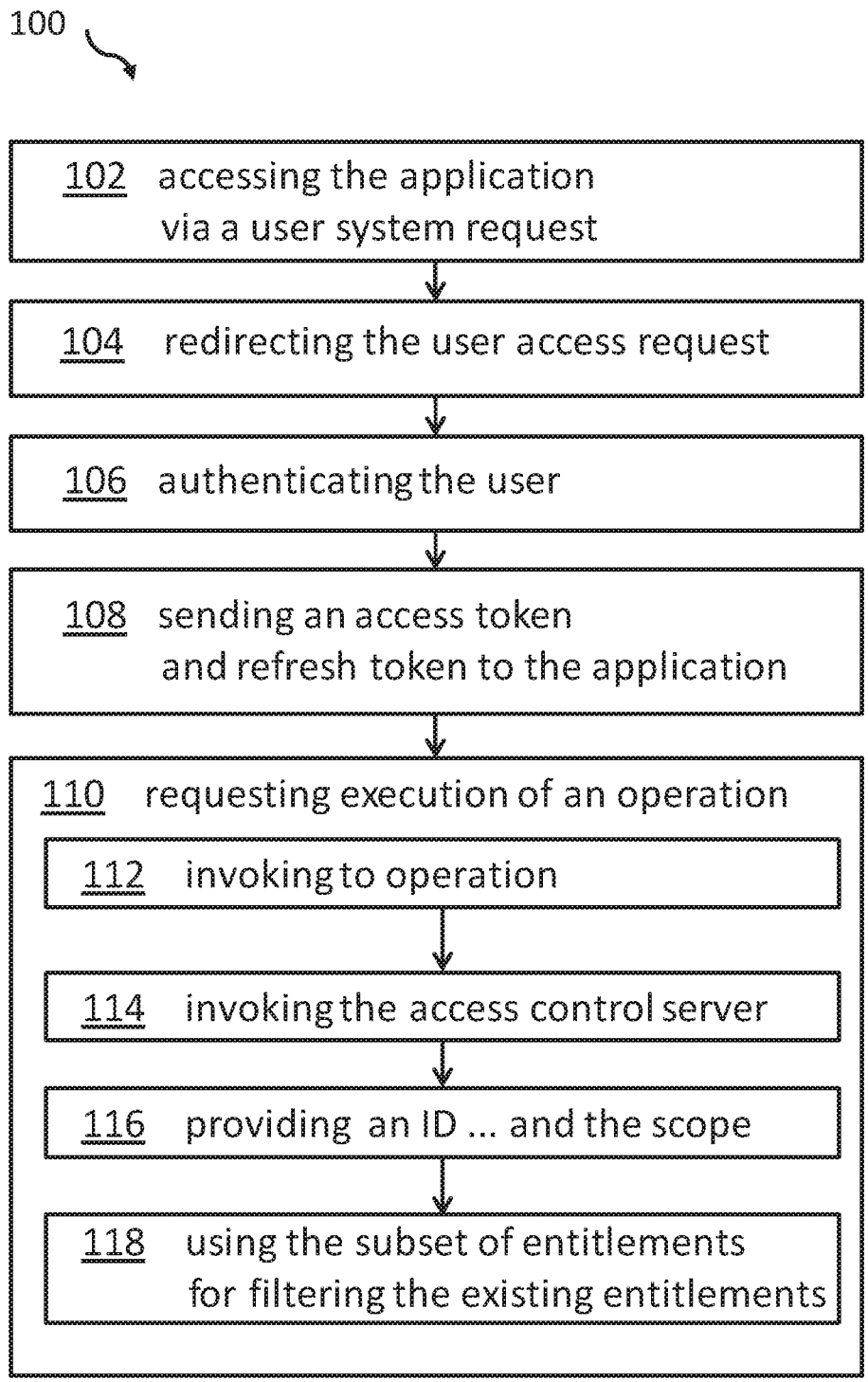

Preferred embodiments of the disclosure will be described, by way of example only, and with reference to the following drawings:

FIG. 1 shows a block diagram of an embodiment of the inventive computer-implemented method for a token-based authorization in a data processing environment.

Figure 2:
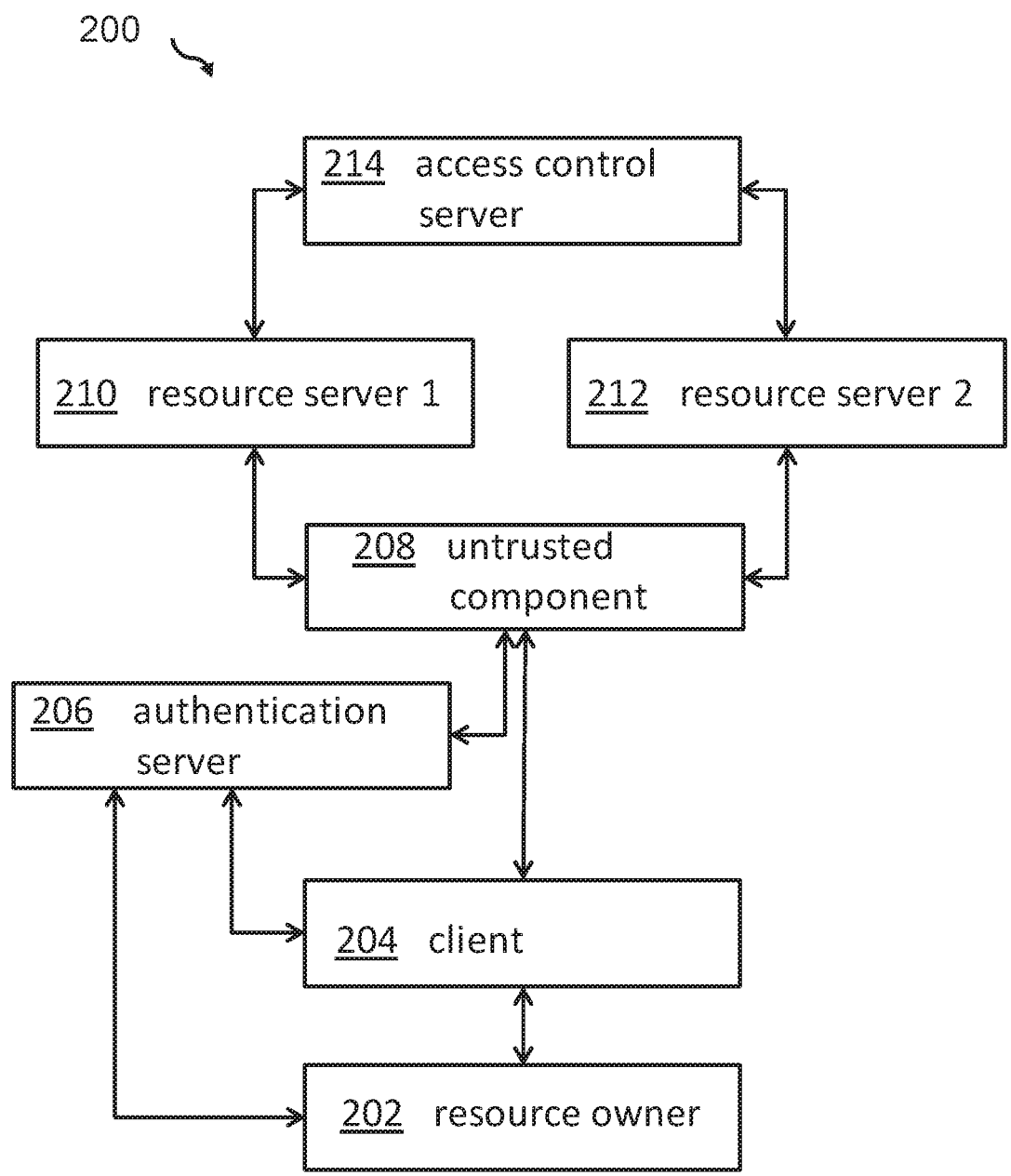

FIG. 2 shows a block diagram of an interaction model underlying the here proposed concept.

Figure 3:
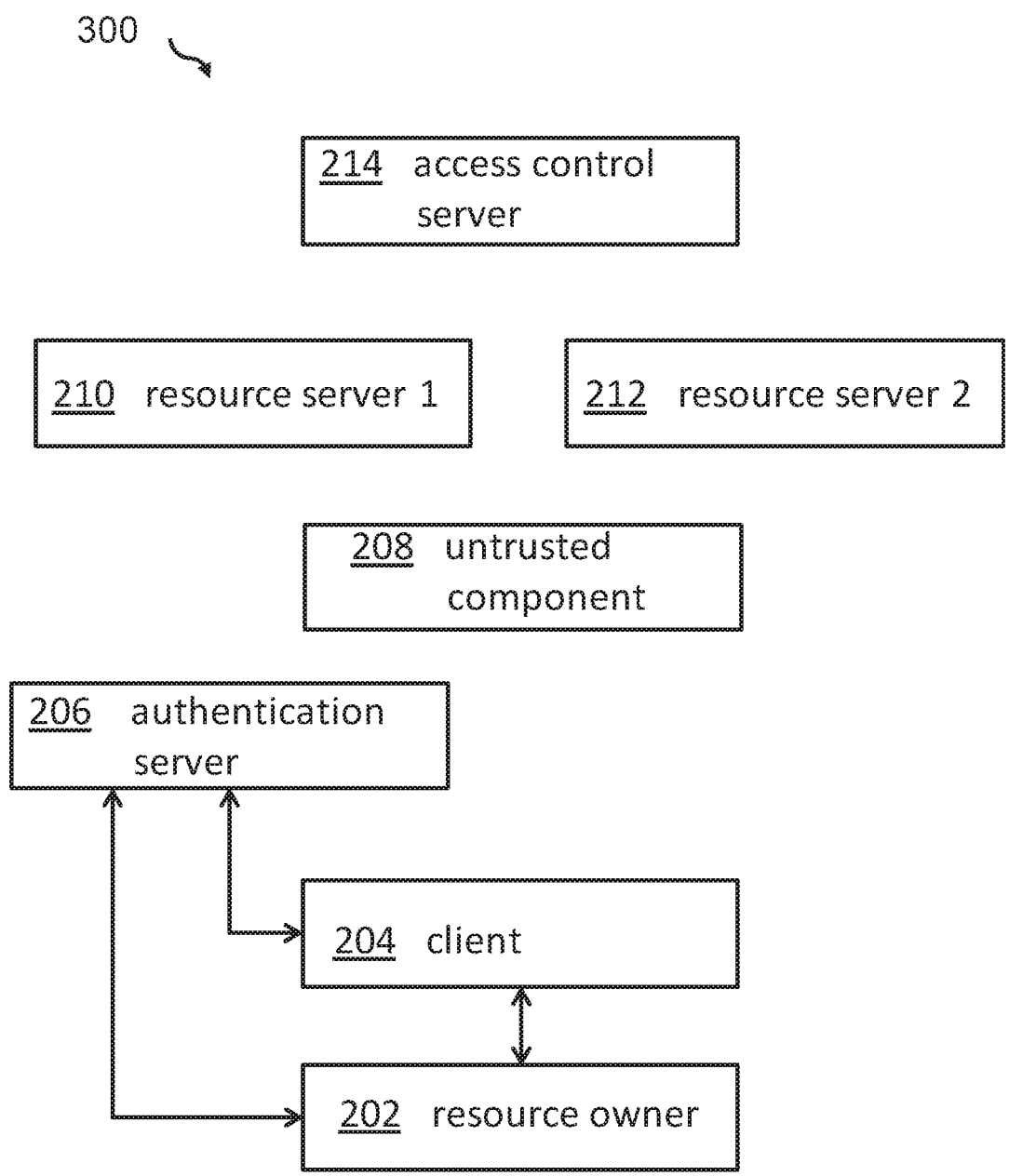

FIG. 3 shows a block diagram of an embodiment of an alternative initiation interaction.

Figure 4:
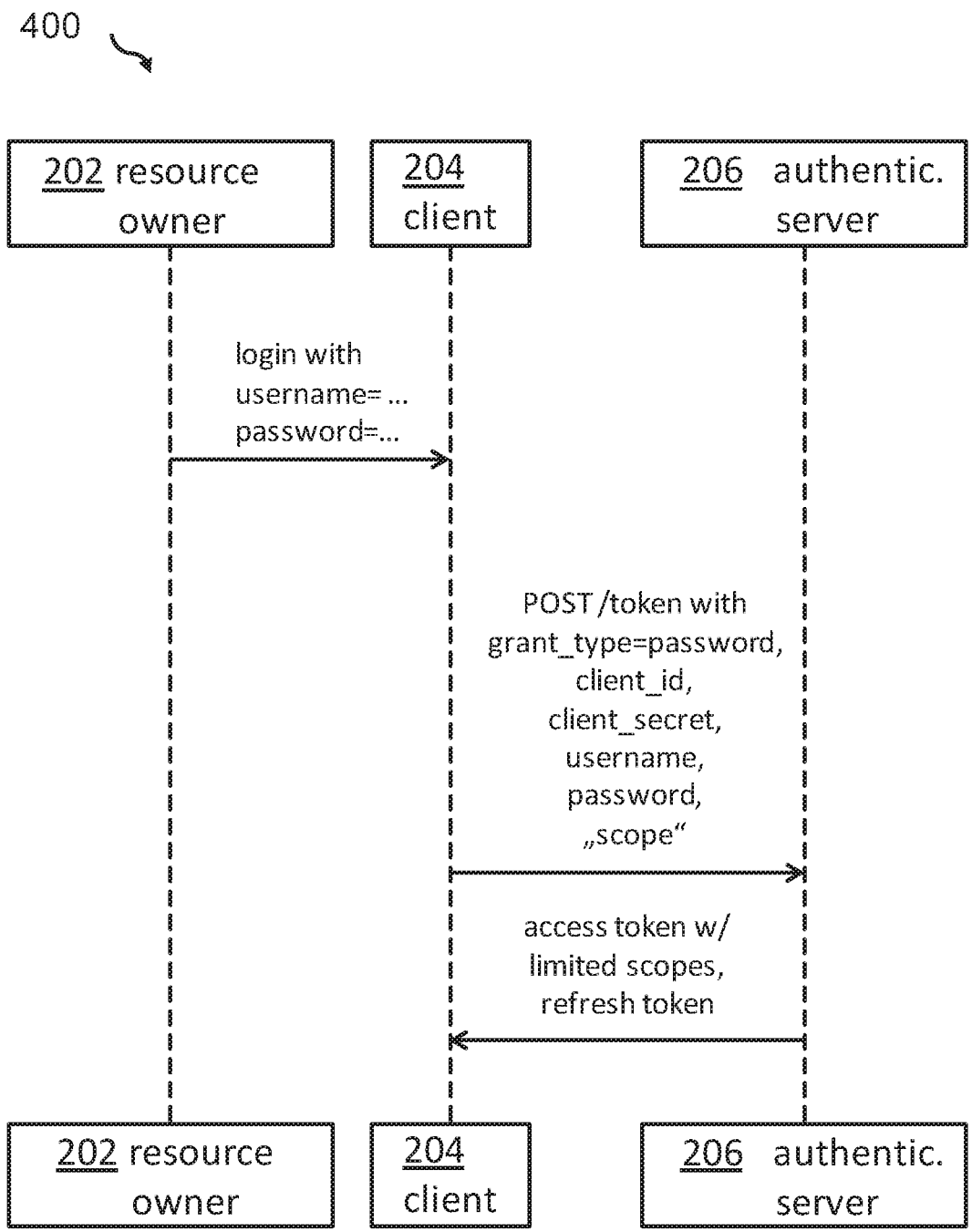

FIG. 4 shows a self-explanatory communication diagram relating to FIG. 3.

Figure 5:
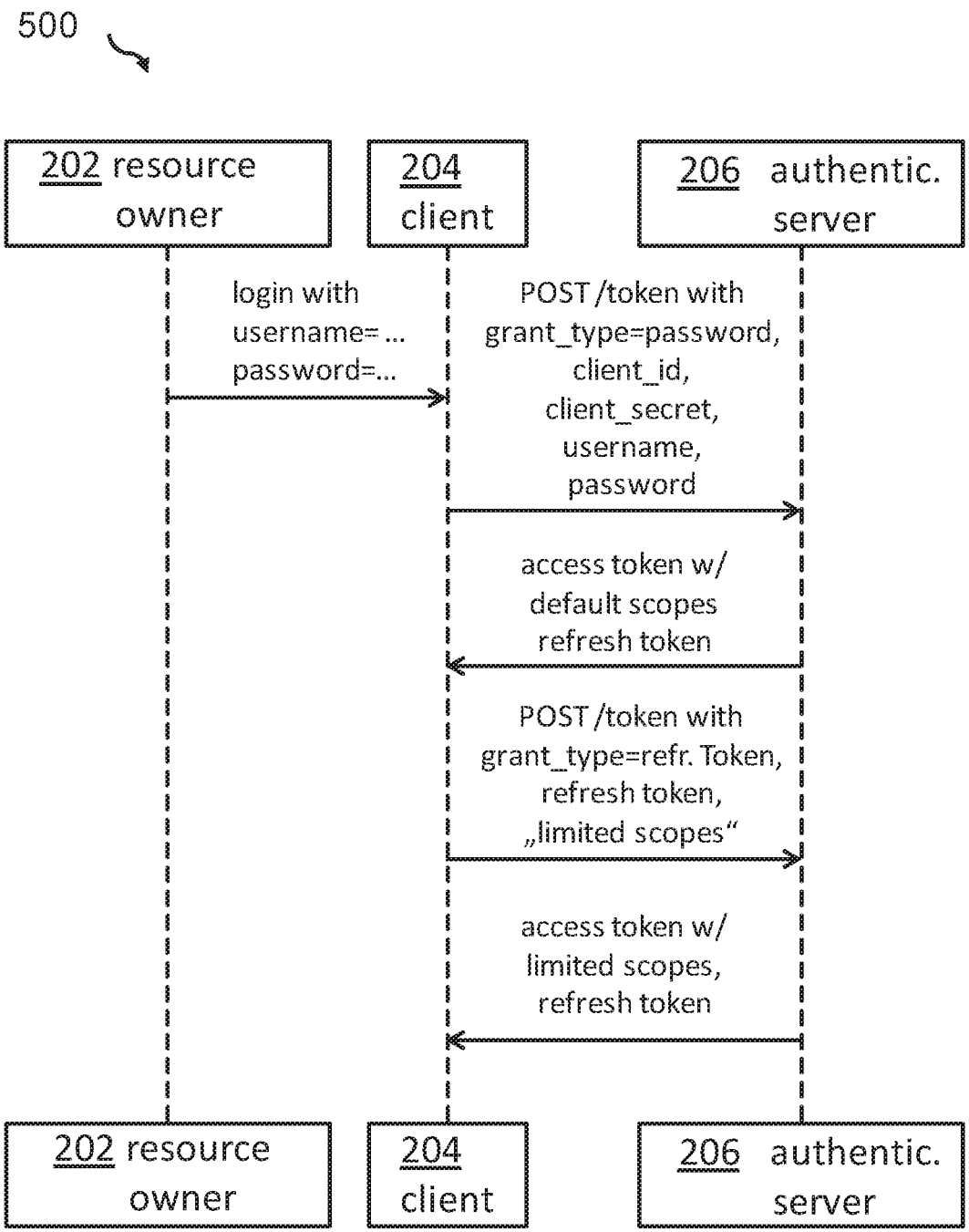

FIG. 5 shows a block diagram of an alternative interaction in which the client retrieves access tokens and/or refresh tokens for the resource owner with limited entitlements.

Figure 6:
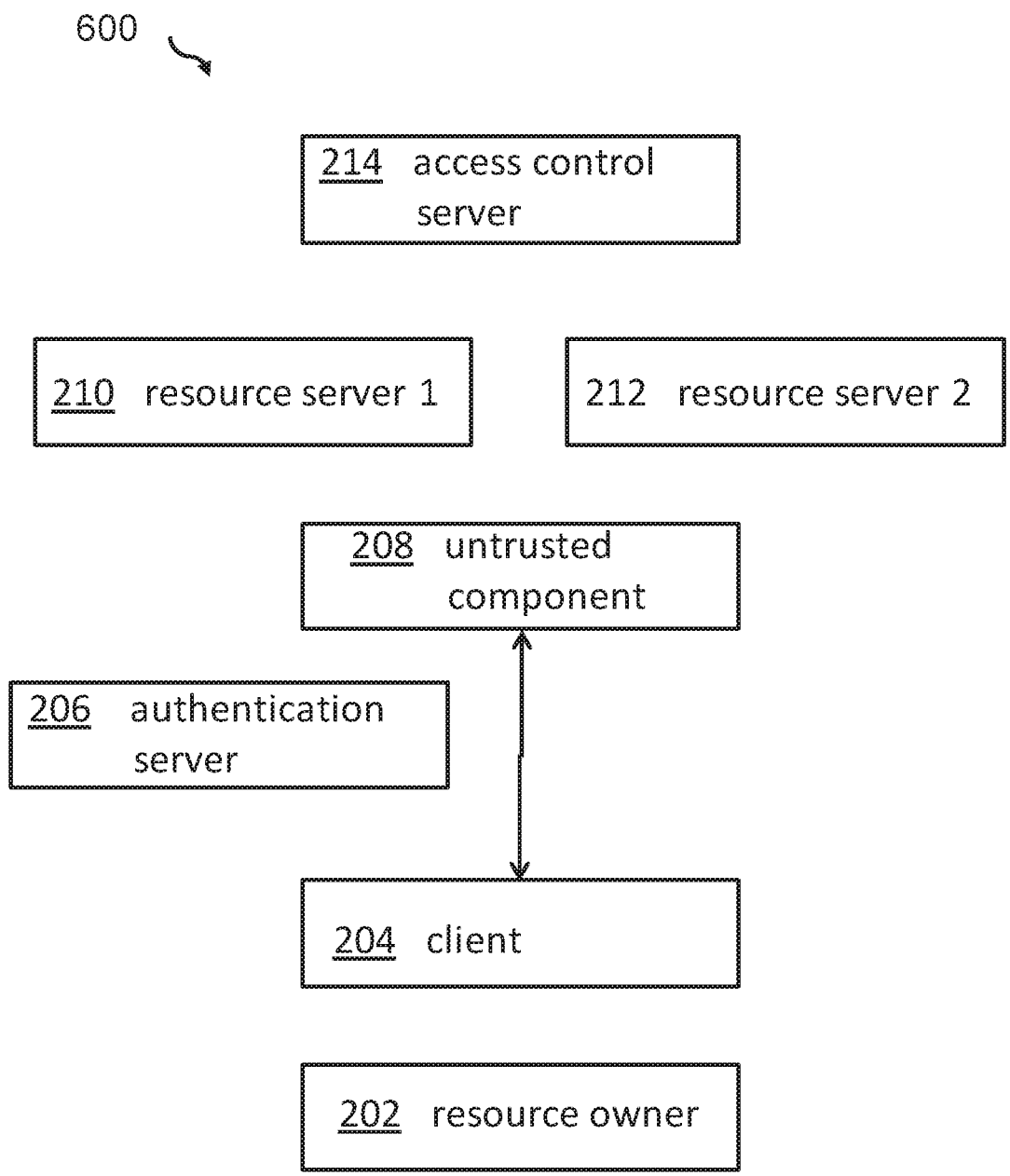

FIG. 6 shows a block diagram of a second type of interaction by which the client invokes an operation on an unsecured component.

Figure 7:
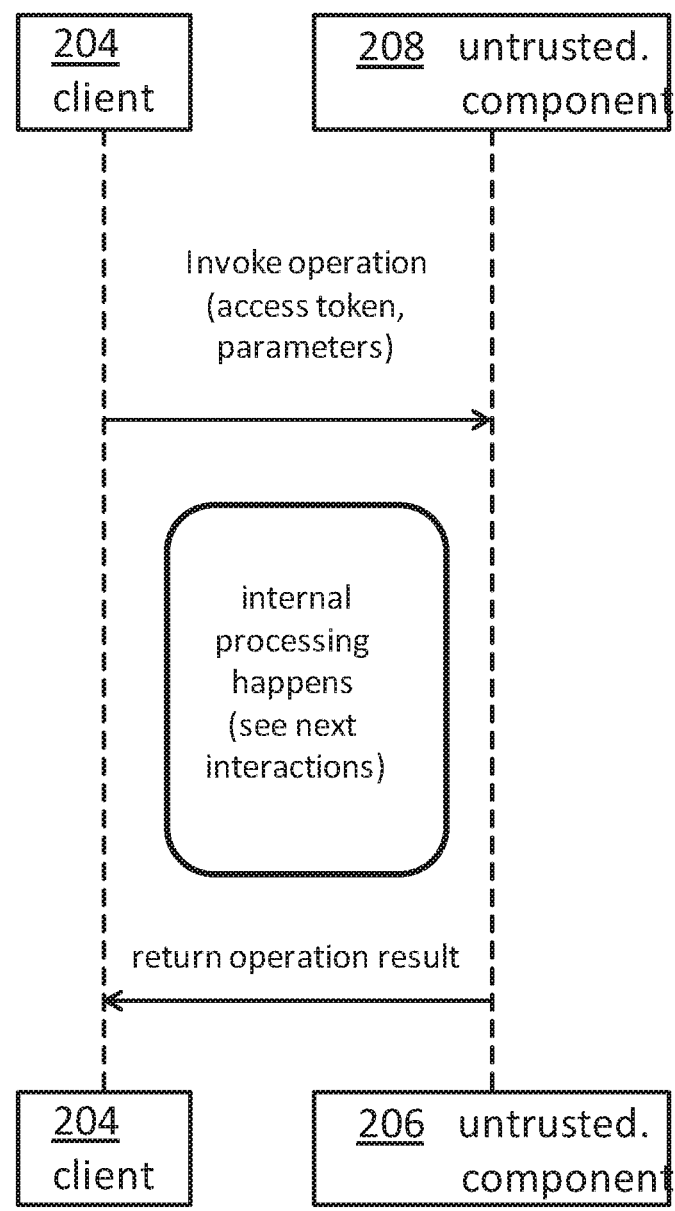

FIG. 7 shows a self-explanatory communication diagram relating to FIG. 6.

Figure 8:
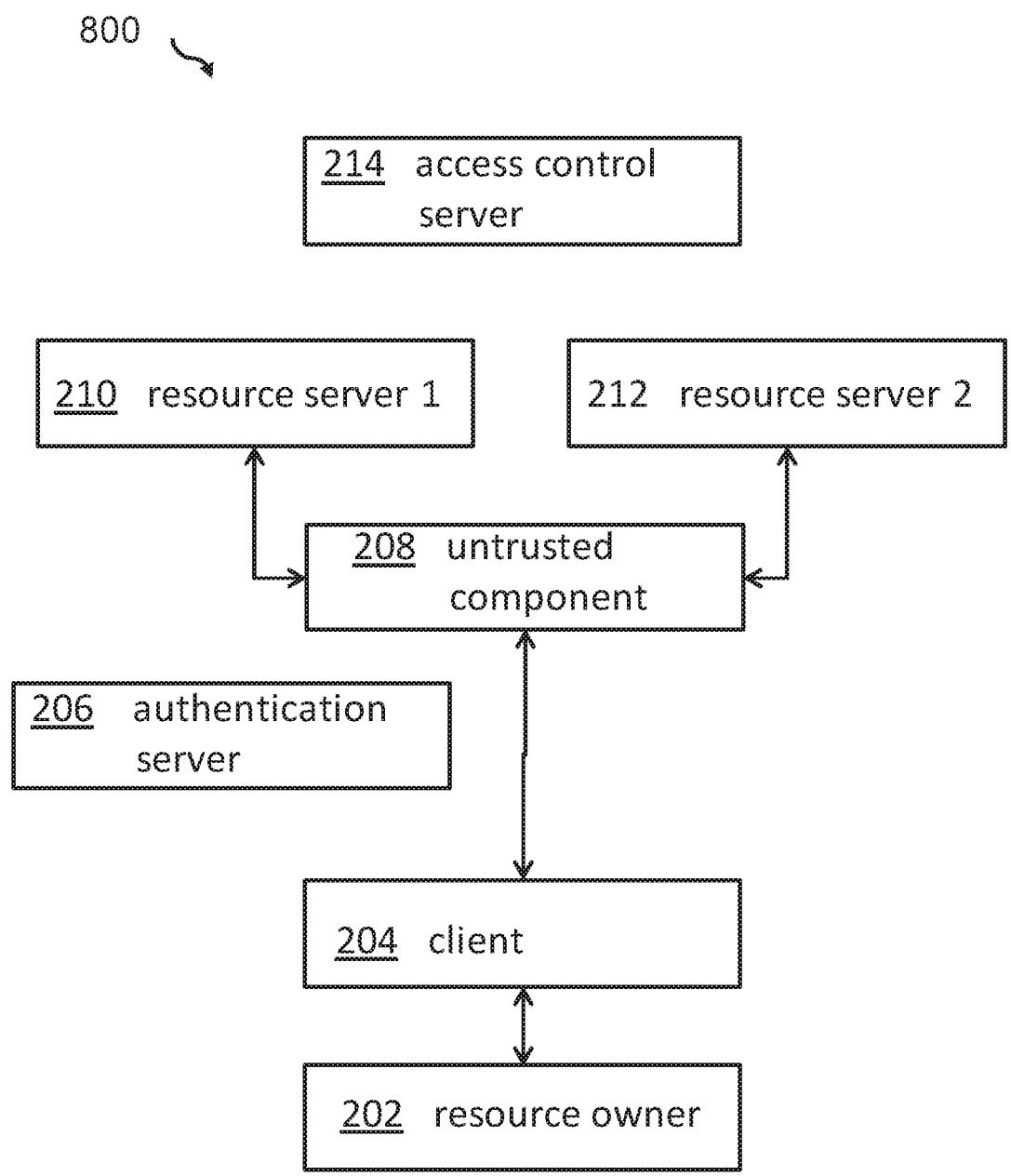

FIG. 8 shows a block diagram of a third type of interaction in which the untrusted component interacts with resource server 1 and resource server 2.

Figure 9:
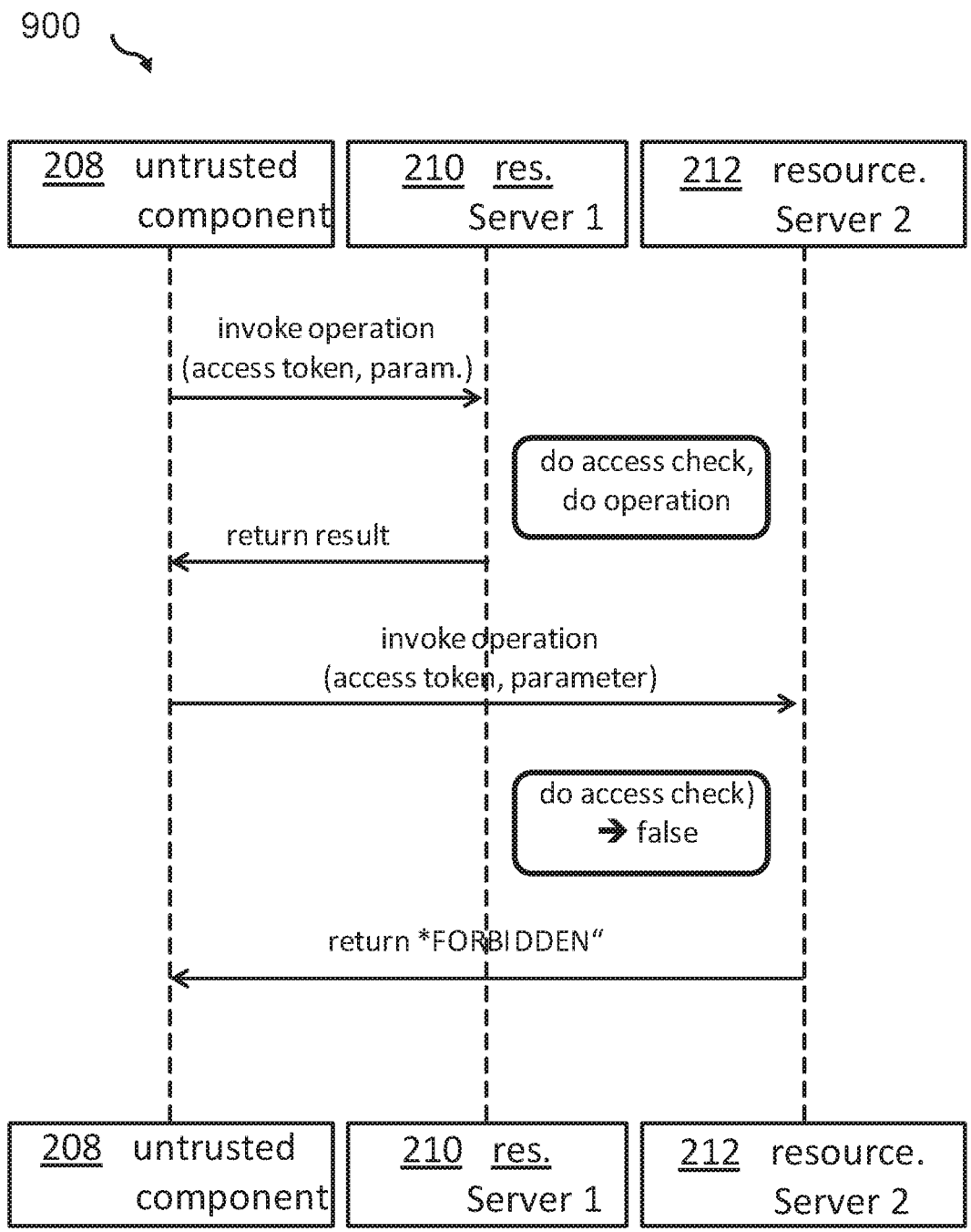

FIG. 9 shows a self-explanatory communication diagram relating to FIG. 8.

Figure 10:
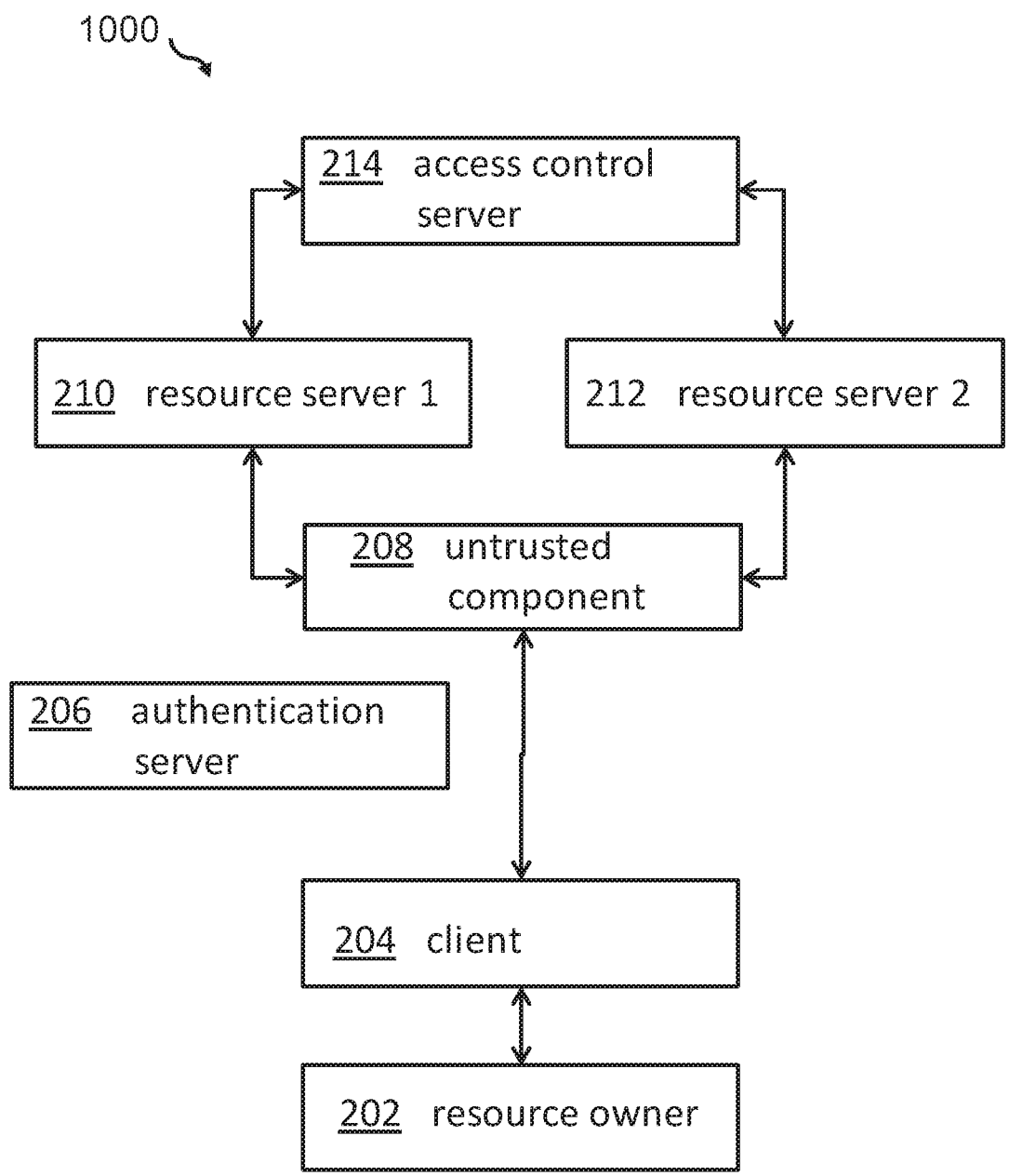

FIG. 10 shows a block diagram of a fourth type of interaction in which the resource server 1 and the resource server 2 interact with access control server.

Figure 11:
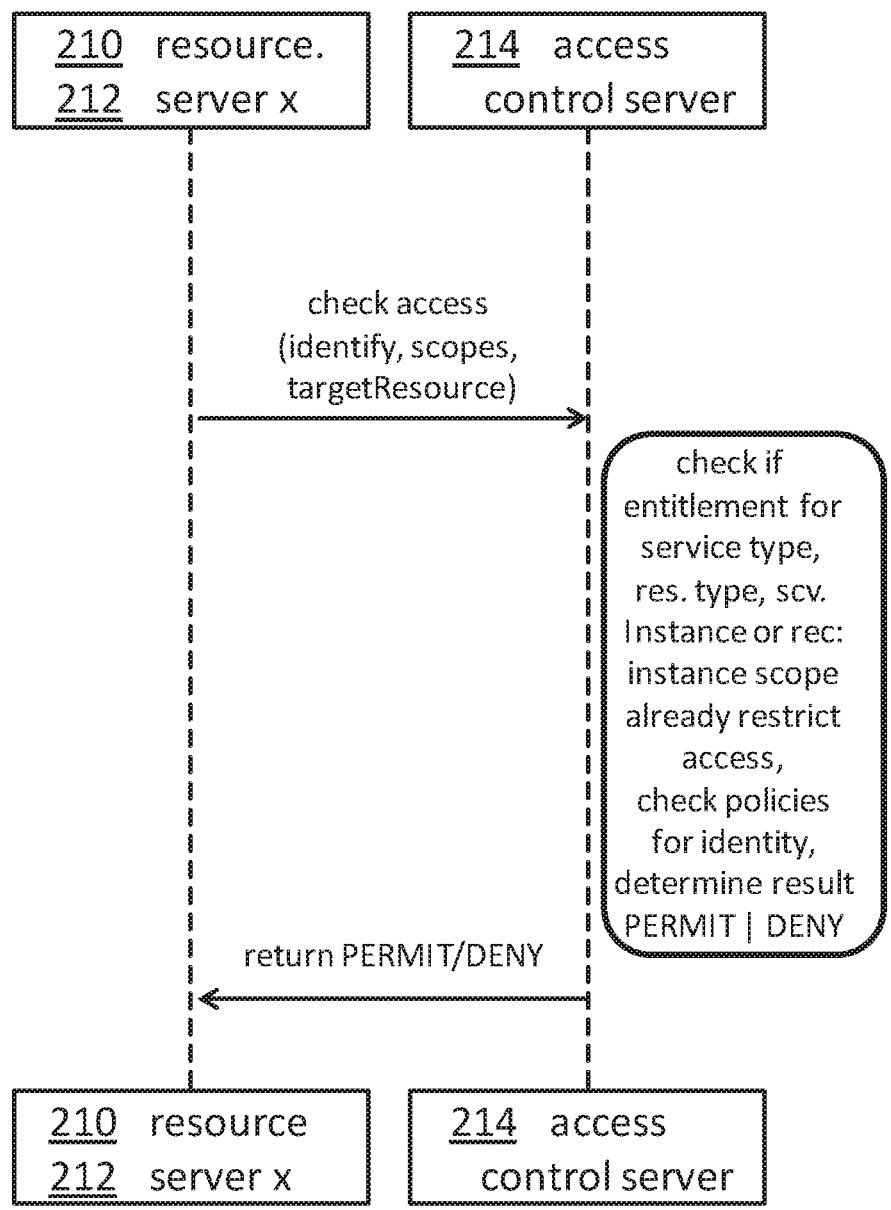

FIG. 11 shows a self-explanatory communication diagram relating to FIG. 10.

Figure 12:
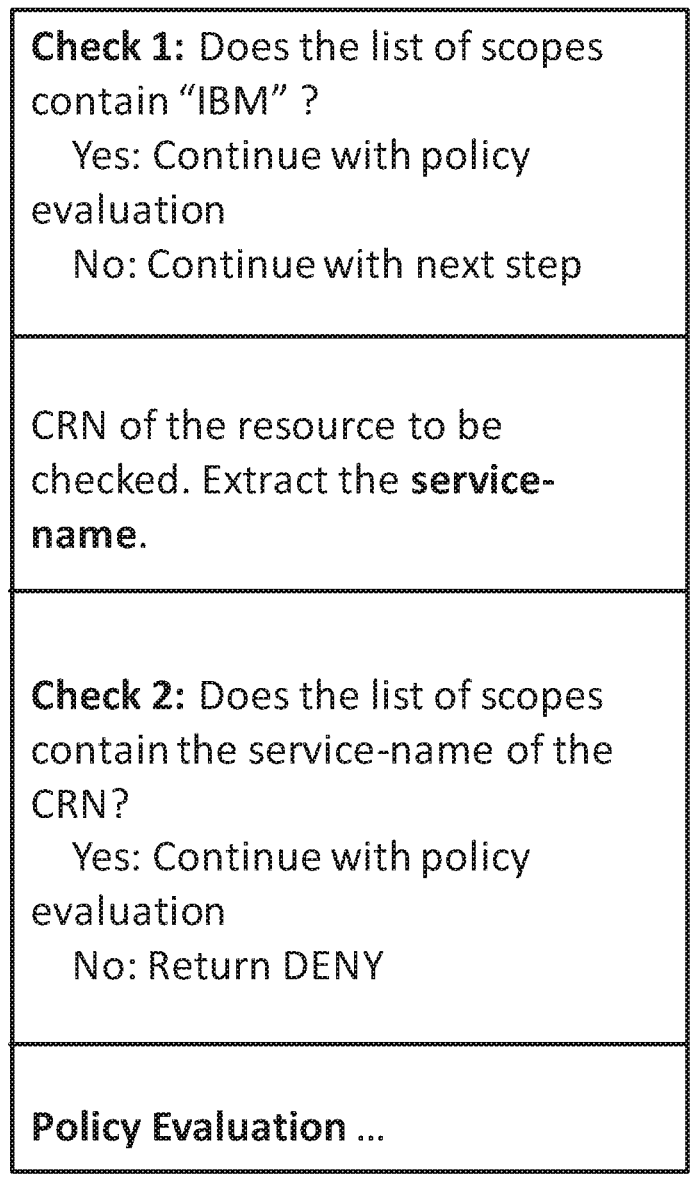

FIG. 12 shows an exemplary pseudo-code segment of traditional access control server decision engine.

FIG. 13 shows an exemplary pseudo-code segment of the here proposed access control server decision engine.

Figure 14:
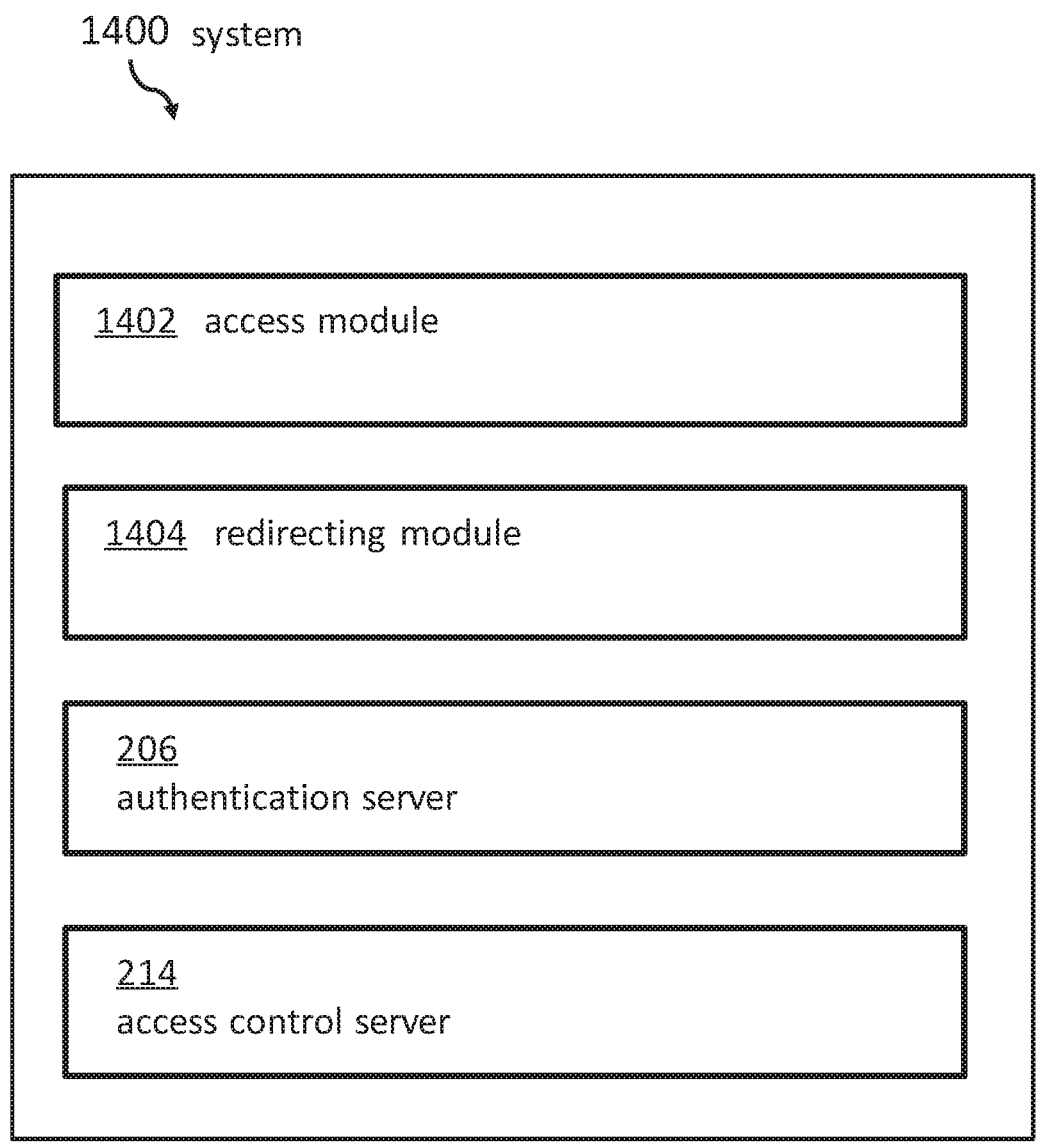

FIG. 14 shows a block diagram of the access system for a token-based authorization in a data processing environment.

Figure 15:
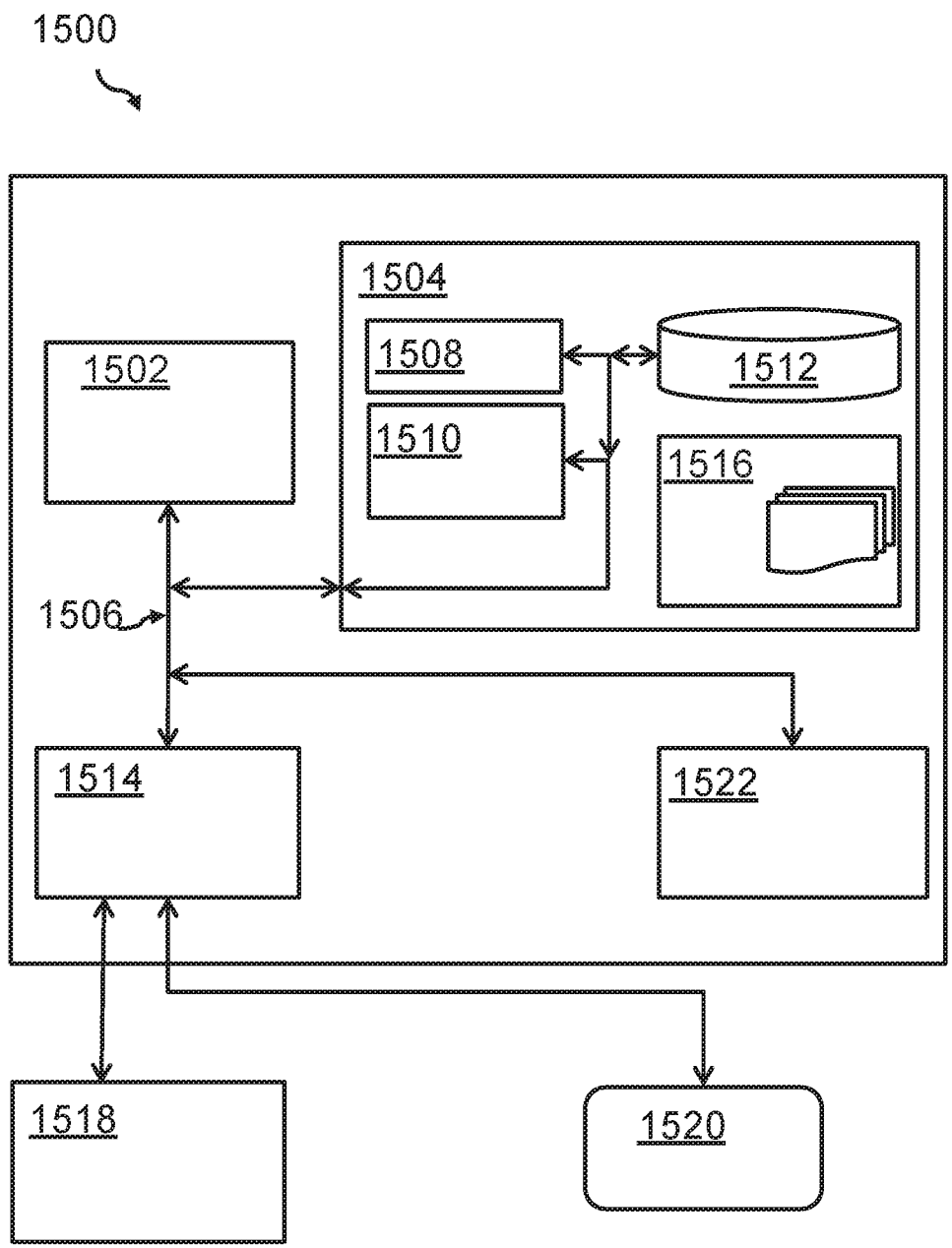

FIG. 15 shows an embodiment of a computing system suitable for executing program code for the here described components.

DETAILED DESCRIPTION

In the context of this description, the following conventions, terms and/or expressions may be used:

The term 'token-based authorization' may denote a mechanism by which a user may receive a temporary data structure, denoted as token, from an authentication server against which he has proven his authentication. Such token may authorize the user to access predefined systems, applications and/or services on e.g., other server systems.

The term 'user system' may denote here typically a user operated device like a personal computer, a mobile device or any other computerized system operated by an end-user.

The term 'application' may denote executable software code delivering one or more services and functions after being activated from a user system. Typically, the application may be managed and executed on a server system, e.g., a server system operated in a data center and/or under the Cloud computing paradigm. Thus, the server system may typically be operated remotely from the user system.

The term 'authentication server' may denote a trusted computing environment—typically being operated by a third party to the user system and the server system—against which an end-user operating the user system—e.g., by using a Web-browser—may authenticate himself to be authorized to access predefined applications and services.

The term 'access control server' may denote a hardware or software system enabled to grant or deny an access to a specific service to an application or a user system using the application.

The term 'operation' may denote a single function of an application, or a plurality of functions and/or services of one or more applications. The type of the operation may be defined and/or restricted by a scope of the access. Examples of operations may be a database read, reading a specified subset of data, manipulating these data, combine the data, execute a search in a content management system and access a specified network address and many more software and/or hardware supported services and/or functions.

The term 'authentication credentials' may denote a set of data used by an end-user (or a related system) to authorize him for accessing predefined functions and services.

The term 'restricted entitlement' may refer to the fact that a user system and/or the related end-user may only have access and/or use functions that are limited if compared to all available functions of an application or a service providing entity. Thus, he may not be entitled to use the full set of functions or services but only to a restricted subset, e.g. read data but not changing the data, also the application may be enabled to do so.

The term 'scope' may denote the defined set of services and/or functions a user system or a related end-user or—in general—system user may have access to. The scope may be the complete set of services and functions available from a resource or it may be limited to only a subset.

The term 'standard semantic' may denote here a defined set of commands and functions of, e.g., a standardized authorization system like OAuth in version 2. However, also other versions may be supported.

The term 'OAuth2' may denote the known open standard for access delegation, commonly used as a way for Internet users to grant websites and/or applications access to their information on other websites but without giving them the password. This mechanism is widely used by the public Internet sites to permit users to share information about their accounts with third-party applications or websites.—Generally, OAuth2, denoting version 2 of the standard, may provide to clients a "secure delegated access" to resources on behalf of a resource owner. It may specify a process for a resource owner to authorize third-party access to their resources—i.e., services and functions—without sharing their credentials (i.e., authentication credentials). Typically, access tokens, issued to the user system by the authorization server, are used to confirm an approval of the resource owner. The third-party, i.e., the end-user with his related user system, may then use the access token to access the protected resources hosted by a server.

Additionally, some terms—in particular roles—of the preferred token-based implementation environment of OAuth2 may also be defined here:

Basically, the roles used are described in the OAuth2 specification RFC 6749.

A resource owner (e.g., end-user, system-user) may be an entity capable of granting access to a protected resource. When the resource owner is a person, it is referred to as an end-user.

A resource server (i.e., service) may be the server hosting the protected resources, capable of accepting and responding to protected resource requests using access tokens. For the here proposed concept, the resource server may be connected to an access control server that may help determine if an operation based on a passed token is allowed or denied.

A client may be an application making protected resource requests on behalf of the resource owner and with its authorization. The term "client" does not imply any implementation characteristics, i.e., this can be a Web-based application, a desktop application or an application running on a different device.

An authorization server may be the server issuing access tokens to the client after successfully authenticating the resource owner (end-user) and obtaining authorization. The authorization server may be the same server as the resource server or a separate entity. A single authorization server may issue access tokens accepted by multiple resource servers.

An untrusted component may—for the here described concept and in addition to the OAuth2 defined roles, execute a script on behalf of the resource owner. For this, it receives the resource owner's access token and uses that to call one or more resource servers.

An access control server—in addition to the OAuth2 defined roles—may be meant to support resource servers in evaluating access requests by comparing properties from the passed token with previously created policies.

Furthermore, it may be noted that the function of the single authorization server according to OAuth2 has been split in the context of the here proposed concept in an authentication server and an access control server for the more fine-grained authorization and access control.

The proposed computer-implemented method for a token-based authentication in a data processing environment may offer multiple advantages and technical effects:

The proposed concept may be seamlessly integrated in an Identity and Access Management (IAM) system that uses a token-based authorization model allowing a fine-grained access control to resource management policies. According to such a model, the token may only identify the actor—i.e., the end-user—of the operation performed, but may delegate any access control to the invoked service. The token itself may only contain a minimum set of authorization properties, e.g., may only indicate if the token may be used to invoke the service and/or function or not.

Additionally, in certain scenarios, the token may be handed over to a potentially untrusted component to execute an operation. In order to limit the potential impact of malfunctions of that component, the proposed concept discloses an elegant way to limit the authorization of a token so that a service receiving such a token will only allow operations on a list of specific service types, service instances, resource types and/or resource instances. Such a list may mix these different types. The target service and its authorization component is modified "under the hood" to honor these limitations effectively. The related restriction of authorization may be scoped by that token only, while other tokens continue to authorize execute operations based on the full set of permissions of that user.

It may also be noted that the here used tokens may have a validity that is time-dependent all-time-delimited. Thus, also refresh tokens may be used which may underlie the same operation principles as the access and/or authentication tokens.

Thus, the general concept of the proposed concept is to restrict a token's access to a subset of existing entitlements of a resource owner to a service instance and/or resource instance by defining the specific semantic of the token scope and modifying the access control without changing the existing entitlements by applying the tokens semantic scope. Thus, the defined existing entitlements may continue to exist as they are; it may only be required to define an additional subset of more delimited functions and/or services.

Thus, the currently available access control on the OAuth2 which may currently limit an access to the service only, identified by the service name, may be enhanced to a plurality of additional access limitations not available as of today and outside the standard of OAuth2, like limited access to a resource type within a service <service-name>.<resource-type>, e.g., kubernetes.pods, limited access to a resource type within a service instance <service-name>:<service-instance>.<resource-type>, e.g., kubernetes:6271293102982712.pods limited access to a resource within a service <service-name>.<resource-type>:<resource>, e.g., kubernetes.pods:mypod, limited access to a resource within a service instance <service-name>:<service-instance>.<resource-type>:<resource>, e.g., kubernetes:6271293102982712.pods:mypod Only the following access restriction is available in the traditional OAuth2 approach:

limited access to a service only <service-name>, e.g., kubernetes, limited access to an action of a service only <service-name>.<action>, e.g., database.read.

Furthermore, tokens may be created with a limited entitlement only; thus, potentially stolen tokes have a less blast radius. E.g., mobile applications that handle tokens could be debugged or hacked by a malicious app on the same mobile device. Having a limited set of entitlements may help reducing the potential blast radius of that stolen token.

Even if discouraged, some web applications keep tokens on the client side, i.e., in the browser's Java script client. Also here, tokens with limited entitlements have a less potential destructive radius in case of cross-site scripting attacks.

According to a preferred embodiment of the method, the standard semantic is based on OAuth2. Thus, the used basis for the here proposed concept may be integrated into an already well defined set of protocols and functions by a refining or improving the already more coarse-grained access control mechanisms to implement access control mechanisms allowing a more fine-grained control of an access to services and functions. Hence, the widely used OAuth security functions—currently available in version 2—are enhanced and improved. It can be expected that the here proposed enhancements may also be used in a later version of OAuth.

According to one advantageous embodiment of the method, the application may be an unsecured component, e.g., Jupyter Notebooks, or similar. Jupyter Notebooks—or Jupyter documents may denote documents produced by the known Jupyter Notebook App which may comprise both, computer code and rich text elements with paragraphs, equations, figures, links, etc. Thereby, the Jupyter Notebook App may be a server-client application that may allow editing and running notebook documents, e.g., on a server system via a Web-browser.

According to one useful embodiment of the method, the request for a restricted entitlement may comprise, in the authentication credentials, a first request, wherein the first request may comprise a maximum subset of existing entitlements. Thus, the initial authorization may allow accessing the complete set of services and functions and may not be restricted to a subset or a restricted entitlement. Such a restriction may be defined or requested at a later time by requesting a refresh token with the limitation.

According to another useful embodiment of the method, a subsequent request for a refresh token (and the related access token)—i.e., accessing the application and/or functions or services subsequent to the initial request—may also comprise a request for a further restricted entitlement. This way, a differentiation between the first access and subsequent accesses may be managed in an elegant way.

According to a permissive embodiment of the method, the operation may comprise at least one selected out of the group comprising an access to predefined data, a database access, a file access, a predefined application programming interface (e.g., some specific analysis or machine learning functions), and/or an access to a specific subnet of a network. In general, the operation may be related to any available low-level function, service or resource available in the computing environment.

According to one advantageous embodiment of the method, the access token may have a predefined validity time. Thus, if the access continues to be authorized, the authorization may have to be refreshed, e.g., by a related refresh token. The validity time may be made significantly shorter than default token life times.

According to another advantageous embodiment of the method, the predefined validity time may be updatable by a privileged user system. Hence, the fine-grained access control may be manageable as any other access control to a group of resources, functions and/or services in a computing environment. An existing IAM system may be used for this task.

In the following, a detailed description of the figures will be given. All instructions in the figures are schematic. Firstly, a block diagram of an embodiment of the inventive computer-implemented method for a token-based authorization in a data processing environment is given. Afterwards, further embodiments, as well as embodiments of the access system for a token-based authorization in a data processing environment, will be described.

FIG. 1 shows a block diagram of an embodiment of the computer-implemented method 100 for a token-based authorization in a data processing environment. The data processing environment comprises at least a user system, an application, an authentication server and an access control server. The user system is connected via a network connection to a server executing the application, wherein the application provides an access to operation—e.g., a database access—wherein at least the operation is identifiable by its identifier.

The method comprises accessing, 102, the application via a user system request—e.g., via a Web-browser—redirecting, 104, the user access request to an authentication server, and authenticating, 106, the user by authentication credentials exchanged between the authentication server and the application. Thereby, the authentication credentials comprise a request for a restricted entitlement using a standard semantic—in particular, OAuth2—of a scope—according to OAuth2.0 terminology—, wherein the restricted entitlement represents a subset of existing entitlements managed by the access control server for a resource. The data required for the restricted entitlement can be embedded into or being part of the standard semantic, i.e., the standard protocol(s) (i.e., OAuth2) used.

The method 100 comprises further sending, 108, an access token together with a refresh token from the authentication server to the application if the authentication has been successful and the application has been registered at the authentication server, wherein the access token and the refresh token comprises the restricted entitlement.

Additionally, the method comprises requesting, 110, execution of an operation by the application initiated by the user system, wherein the requesting comprises invoking, 112, the operation by the application providing the access token comprising restricted entitlements, invoking, 114, the access control server by the operation, providing, 116, an identifier of the user system and the scope of the token comprising the subset of the existing entitlements to the access control server, and using, 118, the subset of entitlements for filtering the existing entitlements by the access control server resulting in an access decision of the user system to the operation.

Before a continuation of the figure description, the here used syntax and semantic of limited entitlements should be explained. To understand the semantic and syntax of limited entitlements in the preferred implementation, an understanding of Cloud Resource Names (CRNs) as they are used, e.g., inside IBM Cloud and its Identity and Access Management system is useful.

The entitlements, CRNs and IAM today may be characterized as follows: Any service and resource in, e.g., the Cloud environment, is uniquely identifiable via a CRN. The base canonical format of a CRN is:
crn:<version>:<cname>:<ctype>:<service-name>:<location>:<scope>:<service-instance>:<resource-type>:<resource>

The parameters are described in table 1.

TABLE 1

| Field | Content |
| --- | --- |
| <version> | Currently only v1 is supported |
| <cname> | For Cloud public: bluemix |
| <ctype> | For Cloud public: public |
| <service-name> | Unique identifying name for a service type |
| <location> | Location of the resource. Many values possible, global for global resources |
| <scope> | Typically an account scope in the format a/<account id> |
| <service-instance> | Identifier for a service instance, if available. Can be blank. |
| <resource-type> | Optional resource type within this service. Can be blank. |
| <resource> | Optional resource identifier. Can be blank. |

The access control component of a Cloud IAM stores authorizations in policies. Policies allow individual users access to services or resources in the Cloud computing environment. A sample policy would be:

Identity: IBMid-2700XYZ
Role: Administrator
Target: crn:v1:bluemix:public:kubernetes::a/1234::::

This policy allows the user with identity "IBMid-2700XYZ" any action that the role "administrator" covers on any service or resource that belongs to the service type "kubernetes" in the account "1234".

When a service wants to decide if a certain action is allowed, the service provides the following information to the access control server: identity/account/required action/target resource/scopes.

Today, a first check is done if the scopes contain the keyword "ibm" or if the scopes contain the service name that is used inside the target resource. If not, the policy check will return "deny". Now, all potential applying policies are evaluated based on account and identity. If a matching policy is found, the policy check will return "PERMIT".

It should be clear that the specific identifiers are only examples. Any other identifiers and/or variables can be used without leaving the scope of the here proposed concept.

FIG. 2 shows a block diagram of an interaction model 200 underlying the here proposed concept. The resource owner 202—typically the end-user sitting in front of a Web-browser—is interacting with a client 204—typically a Web-application that is offering a service to the end-user. For an interactive login experience, the resource owner 202 is redirected to the authentication server 206 for authentication and authorization of the client's access request. The client 204—typically a Web-application—interacts with the authentication server 206 to retrieve or refresh an access token. Additionally, as part of the here proposed concept, the client 204 also interacts with the untrusted component 208 to execute an operation.

The untrusted or unsecure component 208 interacts with resource server 1, 210 and resource server 2, 212 to execute its operation. The resource server 1, 210 and the resource server 2, 212 interact with the access control server 214 to determine if a requested operation is permitted or denied.

In the following preferred implementation, the exemplary two resource servers 210, 212 (many more may be used) are using exemplary the following service types, service instances, resource types, and resource instances according to table 2.

TABLE 2

| resource server | 1, 210 | resource server | 2, 212 |
|---|---|---|---|
| Service Type: | COS | Service Type: | COS |
| Service Instance: | 1 | Service Instance: | 2 |
| Resource Type: | bucket | Resource Type: | bucket |
| Resource Instance: | 123 | Resource Instance: | 456 |

To execute the interaction in the here proposed concept, the following steps may be required:
1. The client 204 retrieves access tokens and refresh tokens for the resource owner 202 (covered by OAuth2 standard) with limited entitlements (part of the novel concept).
2. The client 204 invokes an operation on an untrusted component (normal behavior in a Web-environment).
3. The untrusted component 210 interacts with resource Server 1, 210 and 2, 212 (normal behavior in a Web-environment).
4. The resource server 1, 210 and the resource server 2, 212 interact with access control server 214 to decide if the requested operation should be permitted or not (part of the novel concept).

As prerequisites may be named: The resource owner 202 was assigned policies on the access control server 214 which allows the resource owner 202 to access resources on both, resource server 1, 210 and resource server 2, 212. These policies are not changed during the following interaction, i.e., part of the here newly proposed concept.

FIG. 3 shows a block diagram 300 of an embodiment of an alternative initiation interaction: the client 204 retrieves the access and/or the refresh tokens for the resource owner 202 with limited entitlements. The client 204 retrieves an access and/or refresh token for the resource owner 202 by one of the grant types that are described in the OAuth2 standard. In addition, and as part of the novel concept, the client 204 already passes a list of entitlements to the authorization server 206 to limit the potential access of the access token to be generated. Specifying a list of scopes during token creation is part of the OAuth2 standard, but the semantic of the scopes and usage in later interactions are part of the here newly proposed concept. For this sample interaction, it may be assumed that the list of restricted entitlements is just one element "COS:1.bucket:123".

FIG. 4 shows a related self-explanatory communication diagram 400 showing the client 204, the authentication server 206 and the resource owner 202 with respective messages flows.

FIG. 5 shows a block diagram of an alternative interaction 500 in which the client 204 retrieves access tokens and/or refresh tokens for the resource owner 202 with limited entitlements. The client 204 retrieves an access and/or refresh token for the resource owner 202 by one of the grant types that are described in the OAuth2 standard. In a subsequent step, the client 204 refreshes the access and/or refresh token using the refresh_token grant type and passes a list of restricted entitlements to the authorization server 206 to limit the potential access of the access token and refresh token to be generated. Specifying a list of scopes during token refresh is part of the OAuth2 standard, but the semantic of the scopes and usage in later interactions are part of the here newly proposed concept. For this sample interaction, it may be assumed that the list of restricted entitlements is just one element "COS:1.bucket:123".

FIG. 6 shows a block diagram of a second type of interaction 600 by which the client 204 invokes an operation on an unsecured component 208. After the interaction according to FIGS. 3, 4, 5, there is an access token that carries a set of limited entitlements. In this description, it may be assumed that it comprises an entitlement to access resource server 2, 212, but not to resource server 1, 210.

The client 204 invokes an operation on an unsecured or untrusted component 208. Untrusted components 208 are e.g., scripts that have been developed by others and have not been reviewed or verified to be trustworthy. The invocation of the untrusted component 208 comprises the access token with limited entitlement, which is part of the here proposed concept.

FIG. 7 shows the related self-explanatory communication diagram 700, showing the client 204, and the unsecure component 208 with respective messages flows and processing.

FIG. 8 shows a block diagram 800 of a third type of interaction in which the untrusted component 208 interacts with resource server 1, 210 and resource server 2, 212. As part of the execution of that untrusted component 208, the script starts an operation on resource server 1, 210 providing the access token with limited entitlements. As part of its normal processing, the resource server 1, 210 interacts with the access control server 214 to determine if the resource owner represented by the access token can execute the operation. The resource server 1, 210 is providing the identity inside the access token, the entitlements (scopes) of the access token (COS:1.bucket:123) and the target resource (e.g., cm:v1:bluemix:public:COS::a/1234:1:bucket:123) to execute the operation which is an explicit component of the here proposed concept.

Based on the entitlement inside the access token and the existing policies, the access control server 214 determines to permit the operation. A similar interaction with resource server 2, 212 returns "DENY", as the entitlements (scopes) of the access token (COS:1.bucket:123) do not match the target resource (cm:v1:bluemix:public:COS::a/1234:2:bucket:456).

FIG. 9 shows the related self-explanatory communication diagram 900 showing the untrusted component 208, and the resource server 1, 210 and the resource server 2, 212 with respective message flows and processing.

FIG. 10 shows a block diagram of a fourth type of interaction 1000 in which the resource server 1, 210 and the resource server 2, 212 interact with access control server 214. The untrusted component 208 starts an operation on resource server 1, 210 and then on resource server 2, 212 providing the access token with limited entitlements. Again, as part of normal OAuth2 processing, the resource servers 210, 212 interact with the access control server 214 to determine if the operation is allowed to be executed. The resource servers 210, 212 are providing the identity inside and the entitlements (scopes) of the access token and the target resource to execute the operation.

As the restricted entitlements inside the token do not contain the service instance of resource server 2, 212, the access control server 214 will decide to deny the operation of resource server 2, 212 even that the policies of the identity inside the access token would have a matching policy in the system, which is again an explicit portion of the here newly proposed concept.

FIG. 11 shows the related self-explanatory communication diagram 1100 showing the resource server 1, 210, the resource server 2, 212 and the access control server 214 with respective message flows and processing.

The next two FIGS. 12, 13 show a comparison of pseudo-code segments of a traditional access control server decision engine (FIG. 12) in comparison to the one required for the here proposed concept (FIG. 13). As can easily be seen, a more complex determination for a correct fine-grained access control for restrictive entitlement is required. However, it guarantees a more flexible and secure resource management if compared to the standard OAuth2 access control.

For completeness reasons, FIG. 14 shows a block diagram of the access system 1400 for a token-based authentication in a data processing environment. The data processing environment comprises at least a user system, an application, an authentication server and an access control server (all not shown). Thereby, the user system is connected via a network connection to a server executing the application, and the application provides an access to the operation. At least the operation is identifiable by its identifier. It may also be noted that all components discussed here are connected to a network connecting the components.

The access system 1400 comprises an access module 1402 adapted for accessing the application via a user system request, a redirecting module 1404 adapted for redirecting the user access request to an authentication server 206. The authentication server 206 is adapted for authenticating the user by authentication credentials exchanged between the authentication server and the application, wherein the authentication credentials comprise a request for a restricted entitlement using a standard semantic of a scope, wherein the restricted entitlement represents a subset of existing entitlements managed by the access control server for a resource.

The access system 1400 comprises further a sender adapted for sending an access token together with a refresh token from the authentication server 206 to the application if the authentication has been successful and the application has been registered at the authentication server 206, wherein the access token and the refresh token comprises the restricted entitlement.

Thereby, the user system is adapted for requesting execution of an operation by the application initiated by the user system, wherein the requesting execution of an operation comprises invoking the operation by the application providing the access token comprising restricted entitlements, invoking the access control server by the operation, providing an identifier of the user system and the scope of the token comprising the subset of the existing entitlements to the access control server 214, using the subset of entitlements for filtering the existing entitlements by the access control server 214 resulting in an access decision of the user system to the operation.

Embodiments of the disclosure may be implemented together with virtually any type of computer, regardless of the platform being suitable for storing and/or executing program code. FIG. 15 shows, as an example, a computing system 1500 suitable for executing program code related to the proposed method. Virtually any component of the processing environment can be represented by a computing system according to FIG. 15

The computing system 1500 is only one example of a suitable computer system, and is not intended to suggest any limitation as to the scope of use or functionality of embodiments of the disclosure described herein, regardless, whether the computer system 1500 is capable of being implemented and/or performing any of the functionality set forth hereinabove. In the computer system 1500, there are components, which are operational with numerous other general purpose or special purpose computing system environments or configurations. Examples of well-known computing systems, environments, and/or configurations that may be suitable for use with computer system/server 1500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1500 may be described in the general context of computer system-executable instructions, such as program modules, being executed by a computer system 1500. Generally, program modules may include routines, programs, objects, components, logic, data structures, and so on that perform particular tasks or implement particular abstract data types. Computer system/server 1500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 1500 is shown in the form of a general-purpose computing device. The components of computer system/server 1500 may include, but are not limited to, one or more processors or processing units 1502, a system memory 1504, and a bus 1506 that couple various system components including system memory 1504 to the processor 1502. Bus 1506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1500 typically includes a variety of computer system readable media. Such media may be any available media that is accessible by computer system/server 1500, and it includes both, volatile and non-volatile media, removable and non-removable media.

The system memory 1504 may include computer system readable media in the form of volatile memory, such as random access memory (RAM) 1508 and/or cache memory 1510. Computer system/server 1500 may further include other removable/non-removable, volatile/non-volatile computer system storage media. By way of example only, a storage system 1512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1506 by one or more data media interfaces. As will be further depicted and described below, memory 1504 may include at least one program product having a set (e.g., at least one) of program modules that are configured to carry out the functions of embodiments of the disclosure.

The program/utility, having a set (at least one) of program modules 1516, may be stored in memory 1504 by way of example, and not limiting, as well as an operating system, one or more application programs, other program modules, and program data. Each of the operating systems, one or more application programs, other program modules, and program data or some combination thereof, may include an implementation of a networking environment. Program modules 1516 generally carry out the functions and/or methodologies of embodiments of the disclosure, as described herein.

The computer system/server 1500 may also communicate with one or more external devices 1518 such as a keyboard, a pointing device, a display 1520, etc.; one or more devices that enable a user to interact with computer system/server 1500; and/or any devices (e.g., network card, modem, etc.) that enable computer system/server 1500 to communicate with one or more other computing devices. Such communication can occur via Input/Output (I/O) interfaces 1514. Still yet, computer system/server 1500 may communicate with one or more networks such as a local area network (LAN), a general wide area network (WAN), and/or a public network (e.g., the Internet) via network adapter 1522. As depicted, network adapter 1522 may communicate with the other components of the computer system/server 1500 via bus 1506. It should be understood that, although not shown, other hardware and/or software components could be used in conjunction with computer system/server 1500. Examples, include, but are not limited to: microcode, device drivers, redundant processing units, external disk drive arrays, RAID systems, tape drives, and data archival storage systems, etc.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for a token-based authorization in a data processing environment, wherein the data processing environment comprises at least a user system, an application, an authentication server and an access control server, wherein the user system is connected via a network connection to a server executing the application, wherein the application provides an access to operation, wherein at least the operation is identifiable by its identifier, the method comprising:
    accessing the application via a user system request;
    redirecting the user access request to an authentication server;
    authenticating the user by authentication credentials exchanged between the authentication server and the application, wherein the authentication credentials comprise a request for a restricted entitlement using a standard semantic of a scope, wherein the restricted entitlement represents a subset of existing entitlements managed by the access control server for a resource;
    sending an access token together with a refresh token from the authentication server to the application in response to the authentication being successful and the application being registered at the authentication server, wherein the access token and the refresh token comprises the restricted entitlement; and
    requesting execution of an operation by the application initiated by the user system, wherein the requesting execution of an operation comprises:
        invoking the operation by the application providing the access token comprising restricted entitlements,
        invoking the access control server by the operation,
        providing an identifier of the user system and the scope of the token comprising the subset of the existing entitlements to the access control server, and
        using the subset of entitlements for filtering the existing entitlements by the access control server resulting in an access decision of the user system to the operation.

2. The method according to claim 1, wherein the standard semantic is based on OAuth2.

3. The method according to claim 1, wherein the application is an unsecured component.

4. The method according to claim 1, wherein the request for a restricted entitlement comprised in the authentication credentials is a first request, wherein the first request comprises a maximum subset of existing entitlements.

5. The method according to claim 4, wherein a subsequent request for a refresh token also comprises a request for a further restricted entitlement.

6. The method according to claim 1, wherein the operation comprises at least one selected from of the group consisting of an access to predefined data, a database access, a file access, a predefined application programming interface, and an access to a specific subnet of a network.

7. The method according to claim 1, wherein the access token has a predefined validity time.

8. The method according to claim 7, wherein predefined validity time is updatable by a privileged user system.

9. An access system for a token-based authorization in a data processing environment, wherein the data processing environment comprises at least a user system, an application, an authentication server and an access control server, wherein the user system is connected via a network connection to a server executing the application, wherein the application provides an access to operation, wherein at least the operation is identifiable by its identifier, wherein the access system comprises one or more memories and one or more processors configured to execute instructions on the one or more memories to perform operations comprising:
- accessing the application via a user system request;
- redirecting the user access request to an authentication server;
- authenticating the user by authentication credentials exchanged between the authentication server and the application, wherein the authentication credentials comprise a request for a restricted entitlement using a standard semantic of a scope, wherein the restricted entitlement represents a subset of existing entitlements managed by the access control server for a resource; and
- sending an access token together with a refresh token from the authentication server to the application if the authentication has been successful and the application has been registered at the authentication server, wherein the access token and the refresh token comprises the restricted entitlement, wherein the user system is adapted for requesting execution of an operation by the application initiated by the user system, wherein the requesting execution of an operation comprises:
  - invoking the operation by the application providing the access token comprising restricted entitlements,
  - invoking the access control server by the operation, providing an identifier of the user system and the scope of the token comprising the subset of the existing entitlements to the access control server, and
  - using the subset of entitlements for filtering the existing entitlements by the access control server resulting in an access decision of the user system to the operation.

10. The system according to claim 9, wherein the standard semantic is based on OAuth2.

11. The system according to claim 9, wherein the application is an unsecured component.

12. The system according to claim 9, wherein the request for a restricted entitlement comprised in the authentication credentials is a first request, wherein the first request comprises a maximum subset of existing entitlements.

13. The system according to claim 12, wherein a subsequent request for a refresh token also comprises a request for a further restricted entitlement.

14. The system according to claim 9, wherein the operation comprises at least one selected from the group consisting of an access to predefined data, a database access, a file access, a predefined application programming interface, and an access to a specific subnet of a network.

15. The system according to claim 9, wherein the access token has a predefined validity time.

16. The system according to claim 15, wherein predefined validity time is updatable by a privileged user system.

17. A computer program product for a token-based authorization in a data processing environment, wherein the data processing environment comprises at least a user system, an application, an authentication server and an access control server, wherein the user system is connected via a network connection to a server executing the application, wherein the application provides an access to operation, wherein at least the operation is identifiable by its identifier, said computer program product comprising a computer readable storage medium having program instructions embodied therewith, said program instructions being executable by one or more computing systems or controllers to cause said one or more computing systems to:
- access the application via a user system request;
- redirect the user access request to an authentication server;
- authenticate the user by authentication credentials exchanged between the authentication server and the application, wherein the authentication credentials comprise a request for a restricted entitlement using a standard semantic of a scope, wherein the restricted entitlement represents a subset of existing entitlements managed by the access control server for a resource;
- send an access token together with a refresh token from the authentication server to the application if the authentication has been successful and the application has been registered at the authentication server, wherein the access token and the refresh token comprises the restricted entitlement; and
- request execution of an operation by the application initiated by the user system, wherein the requesting execution of an operation comprises:
  - invoking the operation by the application providing the access token comprising restricted entitlements,
  - invoking the access control server by the operation, providing an identifier of the user system and the scope of the token comprising the subset of the existing entitlements to the access control server, and
  - using the subset of entitlements for filtering the existing entitlements by the access control server resulting in an access decision of the user system to the operation.

* * * * *